United States Patent [19]

Maury

[11] Patent Number: 5,050,219

[45] Date of Patent: Sep. 17, 1991

[54] METHOD OF HANDWRITING RECOGNITION

[75] Inventor: Xavier Maury, Paris, France

[73] Assignee: Anatex, France

[21] Appl. No.: 436,457

[22] Filed: Nov. 14, 1989

Related U.S. Application Data

[63] Continuation of Ser. No. 93,825, Sep. 8, 1987, abandoned.

[30] Foreign Application Priority Data

Sep. 11, 1986 [FR] France .............................. 86 12692
Apr. 17, 1987 [EP] European Pat. Off. ........ 87400911.1

[51] Int. Cl.$^5$ .............................................. G06K 9/00
[52] U.S. Cl. .......................................... 382/3; 382/9; 382/13
[58] Field of Search ...................... 382/3, 9, 13, 15, 21, 382/24, 37–39

[56] References Cited

U.S. PATENT DOCUMENTS

| | | | |
|---|---|---|---|
| 3,111,646 | 11/1963 | Harmon | 382/9 |
| 4,024,500 | 5/1977 | Herbst et al. | 382/13 |
| 4,177,448 | 12/1979 | Brayton | 382/39 |
| 4,284,975 | 8/1981 | Odaka | 382/13 |
| 4,365,235 | 12/1982 | Greanias et al. | 382/13 |
| 4,593,367 | 6/1986 | Slack et al. | 364/513 |
| 4,718,102 | 1/1988 | Crane et al. | 382/38 |
| 4,754,489 | 6/1988 | Bokser | 382/38 |
| 4,773,099 | 9/1988 | Bokser | 382/38 |

Primary Examiner—David K. Moore
Assistant Examiner—Jose L. Couso
Attorney, Agent, or Firm—Steinberg & Raskin

[57] ABSTRACT

A method of recognition of handwriting consisting in applying predetermined criterions to a tracing of handwriting or to elements of this tracing so that several characterizing features of this tracing or of these elements be determined, comparing characterizing features thus determined to characterizing features representative of known elements of writing and identifying one element of the tracing with one known element of writing when the comparison of their characterizing features gives a predetermined result, wherein the improvement consists in the setting up of a sequence of predetermined operating steps in accordance with predetermined characterizing features by applying criterions to the tracing elements.

8 Claims, 7 Drawing Sheets

| code N° | character | criteria I (HBGD) | II (size) | III (increasing- equal- decreasing) |
|---|---|---|---|---|
| 1 | a | GBH | 1 | 2 |
| 2 | a | GBH | 1 | 2 |
| 3 | a | GBH | 2 | 2 |
| 4 | a | BH | 2 | 2 |
| 5 | a | GBH | 2 | 2 |
| 6 | c | G | 1 | 0 |
| 7 | c | GB | 1 | 0 |
| 8 | c | G | 2 | 0 |
| 9 | c | G | 2 | 0 |
| 10 | e | DHG | 1 | 2 |
| 11 | e | DHG | 1 | 2 |
| 12 | e | DHG | 2 | 2 |
| 13 | e | DHG | 2 | 2 |
| 14 | d | GBH | 2 | 3 |
| 15 | d | GBH | 3 | 3 |
| 16 | d | GBH | 4 | 3 |
| 17 | l | DHG | 3 | 2 |
| 18 | l | DHG | 4 | 2 |
| 19 | l | DHG | 3 | 2 |
| 20 | l | DHG | 4 | 2 |
| 21 | l | DHG | 4 | 2 |

FIG. 5

(admise)

METHOD OF HANDWRITING RECOGNITION

This is a continuation of application Ser. No. 093,825, filed 9/8/87, now abandoned.

BACKGROUND OF THE INVENTION

The present invention relates to a method of handwriting recognition.

Studies carried out for many years on the recognition of handwriting by the machine have shown that many problems were raised. The following paragraphs will briefly state these problems and how they may be solved.

The basic elements of writing are the letters and the numerals (let alone specialized signs) and they will be called "writing elements" in the following. These elements are gathered or arranged into words but their recognition should begin with their individualizations. In the printed writing, the letters and other signs are separated (characters) and their boundaries therefore raise no problems. On the contrary, in connected handwriting the elements of the tracing which are representative of writing elements are not individualized (this is the case of the letters in general since the numerals are usually separated from each other) and their recognition therefore requires their boundaries to be previously marked off or the characters to be previously cut out.

Once the tracing has been cut into elements, it is necessary to identify each one of these elements by determining the writing element to which it corresponds. This identification relies upon the use of very various criterions such as sizes, curvatures, slopes, directions etc.

A first approach has been the search for the criterions allowing the "absolute" identification of the writing elements, i.e. which would hold true for any handwritings whatsoever. This approach is successful only if the person who is writing would accept to comply with a very strict presentation, with well shaped letters of regular size and constant orientation.

It has therefore been tried to avoid such constraints by the use of an apprenticeship phase or learning step. In such a case, in a phase previous to the recognition, the person who is writing would trace a known text and the characterizing features of each letter (obtained by applying successive various criterions) would be retained and used later for the comparison with other characterizing features. This process actually makes possible the recognition of handwriting. It however requires a great number of elementary operating steps for being practiced since all the criterions are applied to every tracing element and would give rise to a comparison.

The present methods therefore do not allow the real time recognition of practically any handwritings whatsoever by making use of devices of reasonable powers such for instance as microcomputers.

SUMMARY OF THE INVENTION

The invention relates to a method of handwriting recognition which operates in real time by making use of reduced equipment which does not exceed the power of a microcomputer.

It relates to such a method which allows the recognition of all the handwritings irrespective of their sizes and their styles (non-european alphabets, ideograms, scientific symbols etc.).

More specifically, it relates to a method of recognition making use of the results either of a previous phase of apprenticeship or of a gradual recognition of the writing or of both this previous phase and the gradual recognition not only for the selection of the most effective criterions in the particular case of handwriting considered but also for setting up that sequence of operating steps (decision tree) which is the best adapted to the processing of this writing.

The method of handwriting recognition according to the invention is of the kind which comprises:

the applying of predetermined criterions according to a predetermined sequence of operating steps to a handwriting tracing or to elements of this tracing so that several characterizing features of this tracing or of these elements be determined, the comparison of the thus determined characterizing features to characterizing features representative of known elements of writing, and the identification of one element of the tracing with a known element of writing when the comparison of their characterizing features provides a predetermined result.

The method is characterized in that it comprises the setting up of the sequence of predetermined operating steps in accordance with determined characterizing features by applying the criterions to the elements of the tracing.

It is advantageous that the phase of setting up the sequence of operating steps comprises a determination of the order in which the criterions should be applied to the tracing or to elements of this tracing. It also is advantageous that the set-up phase also comprises the selection of some criterions only among a great number of criterions which may be used.

The characterizing features representative of known elements of writing, the order of the sequence of operating steps and/or the selection of the criterions are advantageously updated gradually during the further operating steps of handwriting recognition.

The method advantageously comprises a previous phase of apprenticeship wherein elements of tracing corresponding to known elements of handwriting such as letters and numerals are subjected to the application of several predetermined criterions so that characterizing features representative of these known elements of writing be determined and retained or stored, this previous phase of apprenticeship comprising the setting up of the sequence of operating steps used for recognition purposes.

Preferably, the method comprises, before applying predetermined criterions, the coding of conspicuous points of the tracing and of the elements of the tracing. It is advantageous too that it also comprises the removal of some conspicuous points in accordance with proximity criterions.

In this advantageous embodiment, the method also comprises the cutting of the tracing into tracing elements. This cutting out of the tracing advantageously comprises the determination of particular points of possible cut and the evaluation for each particular point of the probability that this point would actually constitute a cut between two writing elements. It is advantageous moreover that the sequence of operating steps used for the determination of the probability that a point constitutes a cut between two writing elements be set up in accordance with the characterizing features determined during the phase of apprenticeship.

Preferably, the method moreover comprises the comparison of groups of writing elements provisionally identified with a dictionary containing such groups.

The invention will be better understood and further objects, characterizing features, details and advantages thereof will appear more clearly as the following explanatory description proceeds with reference to the accompanying diagrammatic drawings given by way of non-limiting example only illustrating a presently preferred specific embodiment of the invention and wherein:

DESCRIPTION OF PREFERRED EMBODIMENTS

The following description relates essentially to an embodiment wherein the recognition of a handwriting comprises a first step of apprenticeship requiring the copying by hand of a text known from the machine and then a recognition wherein the results of the phase of apprenticeship are used. The recognition is moreover used for updating the results provided by the phase of apprenticeship. This updating however is not compulsory when the writing of the operator varies but a little over a long period. Moreover, the previous apprenticeship may also be omitted or dispensed with, the recognition being then not very effective at the start, i.e. the machine used has to request much assistance from the operator (places of the cuts of letters, nature of a letter etc). This interactivity is very advantageous within the scope of the invention during the phase of apprenticeship as well as during the phase of recognition proper.

In the embodiment under consideration, the method of recognition according to the invention comprises two separate phases, namely the apprenticeship in relation to a known tracing and then the recognition of unknown tracings with preferably an updating of the results of the apprenticeship during a kind of "continuous apprenticeship". The phase of recognition should be contemplated at first in order to understand the processes and criterions used and the characterizing features which should be known and then the apprenticeship in order to understand how initial characterizing features are obtained.

The following description relates to a particular case of a set of criterions. However, other sets of criterions may be used. This description therefore is a mere example which does not at all limit the scope of the invention.

The recognition would start by applying predetermined criterions. The tracing to be identified should however undergo the delimitation into separate tracing elements. This delimitation is carried out by means of an initial coding of the tracing into conspicuous points by applying a first criterion. This criterion advantageously is the determination of the extrema of the tracing, i.e. of the high points, of the low points, of the right-hand and left-hand ends and of the liftings of the writing instrument (this last point relating to the case of the dynamic acquisition of the writing).

Figure 1:
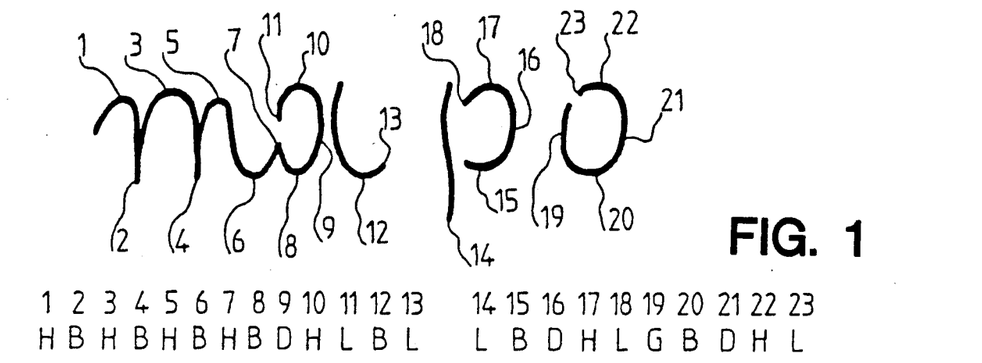
FIG. 1 illustrates some letters and shows how their coding according to the invention is carried out.

FIG. 1 shows by a very enlarged view one portion of a writing tracing comprising four letters belonging to two words, two of these letters being connected and the two others being not connected. The Figure shows on both bottom lines how are construed the conspicuous points of the tracing. These points comprise high points (H), low points (B), left-hand portions (G) and right-hand portions (D) as well as liftings (L) of the writing instrument. In a first stage, this tracing therefore is coded in the form HBHBHBHBDHL-BL-L-BDHL-GBDHL. This code undergoes at first a filtering adapted to remove the points which are too close, by applying a threshold value, in both main reference directions (X and Y). In the particular case of FIG. 1, the removed points are the point 12 (very close to point 13), the points 15 and 19 (too close to the place of putting down the writing instrument) and the point 22 (too close to the lift-up 23). It may be noted that the point 7 although close to the points 6 and 8 is retained. The point 7 corresponds indeed to a very important characterizing feature, namely a point of reflection or cusp and should therefore be retained. The new code therefore is HBHBHBHBDHL-L-L-DHL-BDL.

It should be pointed out that the process which has just been described requires but a very small time of calculation unlike other criterions such as the determination of a curvature and therefore it is desirable that it be almost systematically adopted more especially as it is very discriminating in all the types of handwritings.

Figure 2:
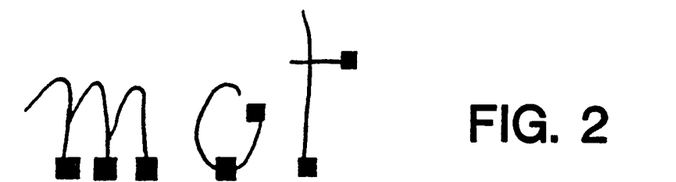
FIG. 2 illustrates a word and shows how its cut-out into letters is contemplated.

As previously noted, the recognition should be preceded by à cutting out, i.e. the cutting out of the tracing into separate writing elements (corresponding each one to one letter). This cutting out advantageously comprises two stages: at first, the determination of all the possible cutting points and then the evaluation of the probability, for each cutting point, that the latter actually constitutes such a cutting point. FIG. 2 depicts a word on which have been shown all the possible cutting points (as small black squares). These points would define "segments" therebetween. The evaluation of the aforesaid probability comprises the calculation of the distance or spacing between the segment involved and the foregoing segment and then, in accordance with this distance, the calculation of the relative position (is there any back-stroke?). These calculations allow to determine within 95% of the cases whether there is a cutting of a letter, a cutting of a word, an accent or a return to the line. The other cases (5% remainders) are treated by extending the notion of letter to a sequence of letters during the apprenticeship. Other criterions may of course be used for determining these cuttings.

The criterions used for the recognition of the letters thus defined or bounded may be very different and a number of them will be dealt with.

Figure 3:
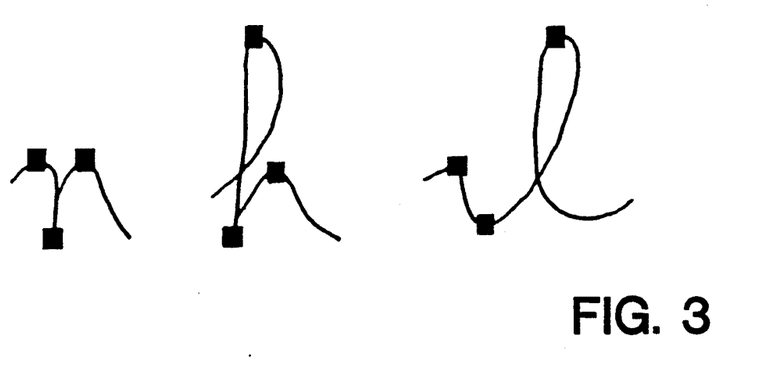
FIG. 3 illustrates some letters and shows how their coding is construed.

A first family of criterions relates to the sizes of the delimited elements. FIG. 3 illustrates some of these criterions. On that Figure, the "n" is the type HBH of equal height (it should be noted that the conspicuous points actually representing a cutting point have been removed), the "h" is of the decreasing type HBH and the group "il" is of the increasing type HBH. The loops may be very open or open or closed. The loops may be open rightwards or leftwards or closed rightwards or leftwards.

A second family of criterions relates to the sizes. The tracing element may be very big (handwritten f), big (l), small (a) or very small (,). These criterions may apply to any element or to one segment only thereof (between two conspicuous points). Likewise, the element may be very wide, wide, narrow or very narrow.

A third family is that of the curvatures. It comprises the curvatures in the clockwise direction and in the reverse direction as well as the points of reflection or cusps. It also comprises the absence of curvature (segment of a straight line) and the presence of a cutting.

A fourth family is that of the rectangles. The rectangle may be high (letter "l"), low (letter "m") or square (letter "a"). These criterion of the rectangle may be applied to the whole of the tracing element or to one part only.

A fifth family is that of the relative positions of the conspicuous points. It allows to determine characterizing features such as: move back, be stationary, move forward, move forward very quickly, decreasing, equal, increasing, near, far or remote, etc.

A sixth family relates to the orientations. It gives the following characterizing features: high, high-right, right, low-right, low, low-left, left and high-left. It also gives the general orientation between two put-down, between two lift-up, between a put-down and a lift-up and between a lift-up and a put-down. The orientation may also be determined for a segment or for all the initial or final stroke or line.

A seventh family is that of the positionings. It relates to the determination of the position of a tracing with respect to conspicuous lines (base line, space between two lines). These criterions allow the determination of medial areas, of accents and of commas and the presence of ascenders and of down strokes.

An eighth family possibly used comprises the treatment of the points which have been removed upon the initial filtering of the code.

A ninth family is that of the extreme codes. It shows how are delimited both ends of the elements of the tracing (put-down, lift-up or cut).

Other criterions and families of criterions may of course be used if they have a discriminating character.

After the determination of the characterizing features of the tracing elements, these characterizing features are compared to those of the writing elements which have been determined during the apprenticeship.

However, all these criterions are much too numerous for being used in real time in a recognition. This is the reason why it has already been attempted to arrange these criterions by organizing them according to a decision tree the first levels of which comprise the most discriminating criterions. Nevertheless, as this organization should have been appropriate to any writings whatsoever to be identified, the tree had to retain all the criterions and to have a very large number of levels. It was not possible to obtain a real time recognition in such a way without a very powerful equipment.

However, a small number only of criterions may in general be enough for the recognition. For this purpose, the example of the French word "adresse" shown on FIG. 4 will be considered.

Figure 4:
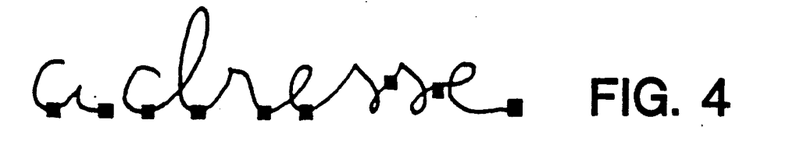
FIG. 4 shows a handwritten word used for the description of operating steps performed during the recognition.

On FIG. 4, the black squares stand for possible cutting points. A "segment" is a tracing element extending between two successive points of the tracing or between a start of tracing and the first possible cutting point. The first operating step is this determination of these conspicuous points according to a purely automatic process.

Then, the operating steps of partial recognition, of cutting out into letters (i.e. possible collecting of several segments into a single letter) in accordance with this partial recognition and of final recognition in accordance with this cutting out into complete letters are carried out, sometimes even by making use of lexical graphic rules or even of a real dictionary.

Thus, in the particular case of the French word "adresse" shown on FIG. 4, the first criterion used is the criterion "HGBDL" already described for the coding with reference to FIG. 1. The first segment having the code HGB may be either a C or a portion of letter D, A or Q. The second segment has a code BHB and may represent a I, a L or a portion of letter H or F. The combination of both first segments may not be a Q and, in case of combination, it may only be a D or a A. The third segment has a code HGB like the first one and may therefore be a C or a portion of letter D, A or Q. The fourth segment has a code BDGB and may represent a L alone or a portion of letter D or A (in combination with the foregoing segment). The following segment has a code BHB which may represent alone or together with a following segment various letters but which may, in combination with the foregoing segment, form a H. Similar remarks apply to the following segments.

It should therefore be pointed out that the application of one single criterion leaves the following combinations only available (for the beginning of the word only): CICL, CICH, CID, CIA, ACL, ACH, AD, AA, DCL, DCH, DD and DA.

Then will be used the criterion "increasing-equal-decreasing" (first family of criterions referred to previously). This criterion applied to the group of the two first segments gives the result "equal or decreasing" and, as applied to the group of the third and of the fourth segments, gives the result "increasing". Therefore, the fourth and the eighth to the twelfth possible solutions given by the first criterion are removed. There only remains six possible combinations.

Another criterion then allows an additional reduction and the comparison to a dictionary may remove the last ambiguities.

It should thus be noted that a very small number of criterions only provides a very broad selectivity. Moreover, these criterions may be obtained very simply and do not require a long time of processing or calculation by the machine. It is the selection of these criterions and their small number allowed by the construction of the sequence of operating steps of specific recognition of the writing involved which makes possible the real time recognition of the writing.

The determination of the criterions to be used, the construction of the sequence of operating steps and the determination of the characterizing features of the elements of the handwriting considered are provided by an apprenticeship. Thus, the phase of apprenticeship is used according to the invention for the selection of the most discriminating criterions in the particular case of the treated writing and for the setting up of the decision tree (sequence of elementary operating steps) which provides the quickest and the most effective recognition for this particular case.

The phase of apprenticeship should now be considered. The purpose of this phase is the selection and the organization of the criterions. It should therefore make use of a great number of criterions, preferably the greatest possible number. Then, it should determine the effectiveness of each one of the criterions and make a choice among the criterions. It should also avoid the criterions giving insufficiently stable results.

The apprenticeship comprises the acquisition of a known text, the cutting out of this text into letters and then the determination of the characterizing features by applying the criterions (measurement), the processing of the values of the characterizing features, the computation of the probabilities of recognition and at last the setting up of the sequence of operating steps constituting the decision tree.

The first stage, viz. the acquisition, comprises the copying by the user of a fragmentary text for instance by means of a graphical table connected to a microcomputer. The text preferably contains all the signs of the set of signs used, for instance the letters, the numerals and the punctuation signs of an alphabet as well as the symbols for the correction. Of course, the more the text samples are representative of the further recognition to be performed, the more the apprenticeship will be efficient.

The following stage is the cutting out. The cutting out into segments is fully carried out by the machine which needs no assistance of an operator to the extent where it knows the text. However, the selection of the cutting points (delimitation of the letters) would involve the responsibility of the operator in respect of the results which may be obtained since it is the operator who eventually decides the identification of its tracing with one or several letters. Subsequent to the cutting out, one tracing element is associated with one sign (letter, numeral etc). The apprenticeship is speeded up when the device used for the acquisition (microcomputer connected to a graphical table) itself shows where it intends to make the cut. The operator has only to enable the cut between the letters or, on the contrary, to show where it has to be made.

The following stage is the measurement of the characterizing features by applying the criterions previously stated. The measurement consists in its principle to make the full analysis of a tracing by means of all the criterions. Every letter which after the cutting out was associated with a tracing is now associated with a list of values, those of the criterions. This list of values is referred to as a measuring element which therefore constitutes a set of characterizing features.

Figure 5:
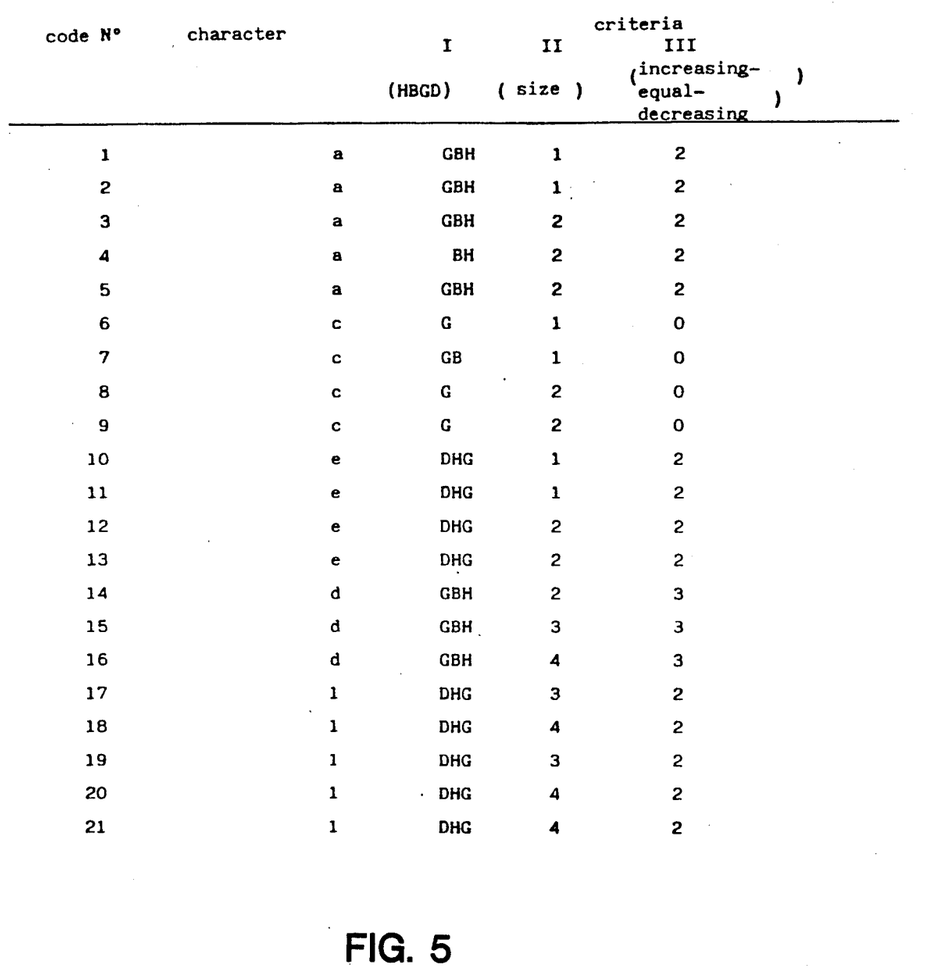
FIG. 5 is a table showing the result of the analysis of a handwritten text according to the present invention.

FIG. 5 shows by way of example a table which represents, in the form of an overall structure, the set of letters with the differing versions of one letter and associates with each writing element its measuring element. This table shows a simplified example to facilitate the understanding of the organization of this structure. According to this table, the analysis of the known text has allowed the system to distinguish five different versions of the letters a and l, four versions of the letters c and e and three versions of the letter d. Each letter and letter version is identified by a number constituting a code which is seen in the first column. The columns I, II and III show each one the values which have been obtained by applying one criterion. Thus, the column I shows the values forming the result of applying the criterion HBGD such as above-defined with reference to FIG. 1. The column II shows the results for each letter of applying the size criterion. This criterion allows to make four distinctions represented by the four codes 1 to 4 which mean "very small", "small", "big" and "very big", respectively. The column III relates to the criterion of relative size, i.e. to the criterion "decreasing-equal-increasing" with the four codes of distinction 0 to 4 representing "uncalculatable", "decreasing", "equal", "increasing", respectively.

Figure 6:
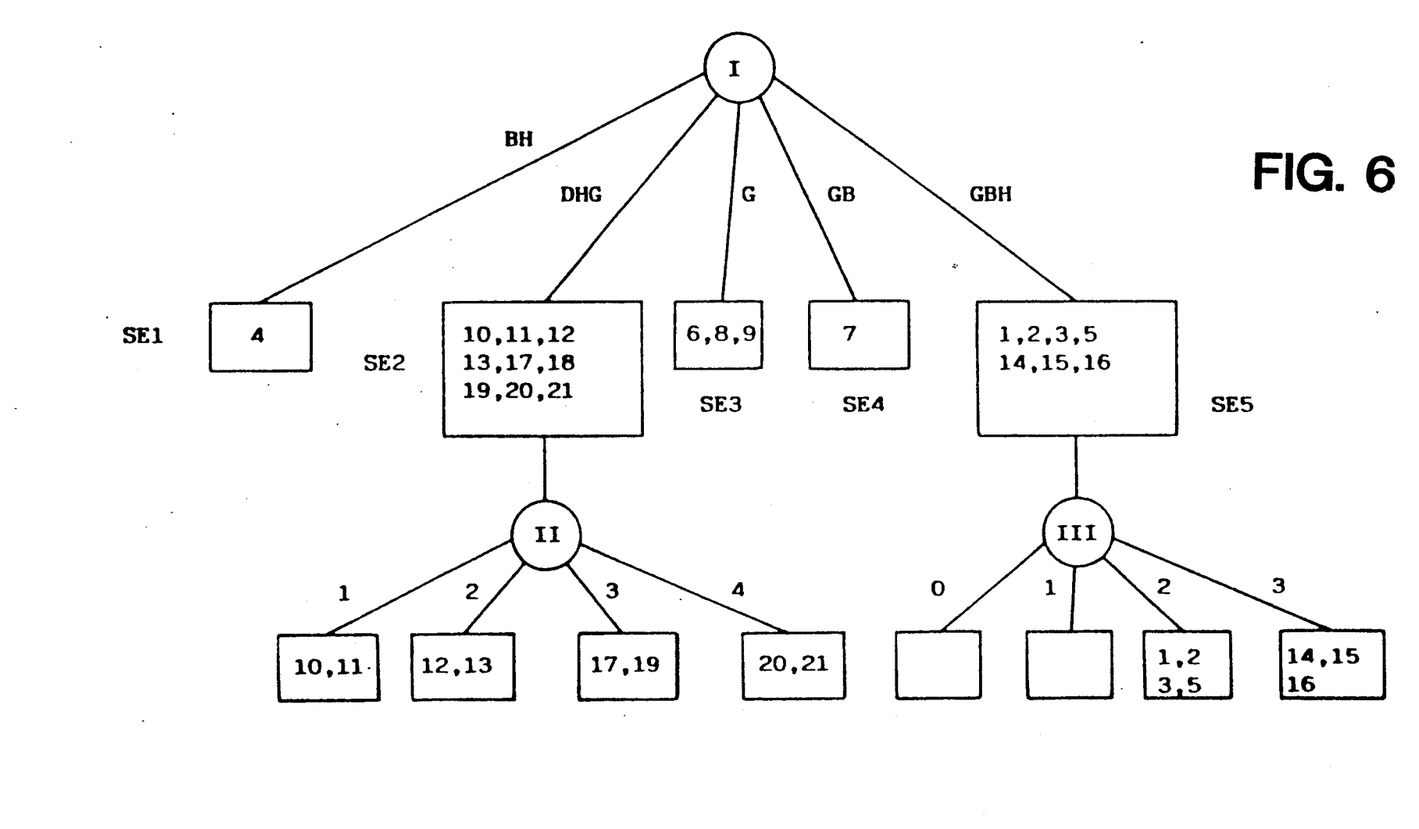
FIG. 6 shows the decision tree set up from the table of FIG. 5.

The table only shows three columns of criterions but it should be understood that there are as many columns as there are criterions. After having set up through the system the overall structure of the letters together with their measuring element, these are subjected to a heuristic treatment. The latter will be explained with reference to FIGS. 6 to 10 and allows the design of a decision tree which will be used during the recognition of a text written by the person the writing of which has permitted the table according to FIG. 5 to be set up but who is unknown to the system. The heuristic treatment advantageously begins by applying the criterion HBGD which has proved to be the most discriminatory one to the whole of the letters. The column I contains five coded distinction elements and the application of this criterion allows to set up five sub-sets SE1 to SE5, one sub-set for each distinctive element (FIG. 6). On the table, the element BH is present once only and designates the character 4 which is an a. The element DHG is included in the measuring elements of the characters having the code numbers 10, 11, 12, 13, 17, 18, 19, 20, 21. These characters which designate the letters e and l are therefore contained within a sub-set designated by SE2. In the same way are obtained the sub-sets SE3 containing the characters 6, 8 which all are c, the sub-set SE4 containing the character having the code number 7 and which is a c and the sub-set SE5 which comprises the code numbers 1, 2, 3, 5, 14, 15 and 16 which designate the characters a and d.

As the sub-sets SE1, SE3, SE4 contain one single character only, the process of recognition of the corresponding characters or letters is completed. The sub-sets SE2 and SE5 however contain different letters. Their recognition requires a more thorough analysis. The latter would consist in applying to these sub-sets all the criterions which have not been previously used hence all the criterions except for the criterion HBGD.

Figure 7:
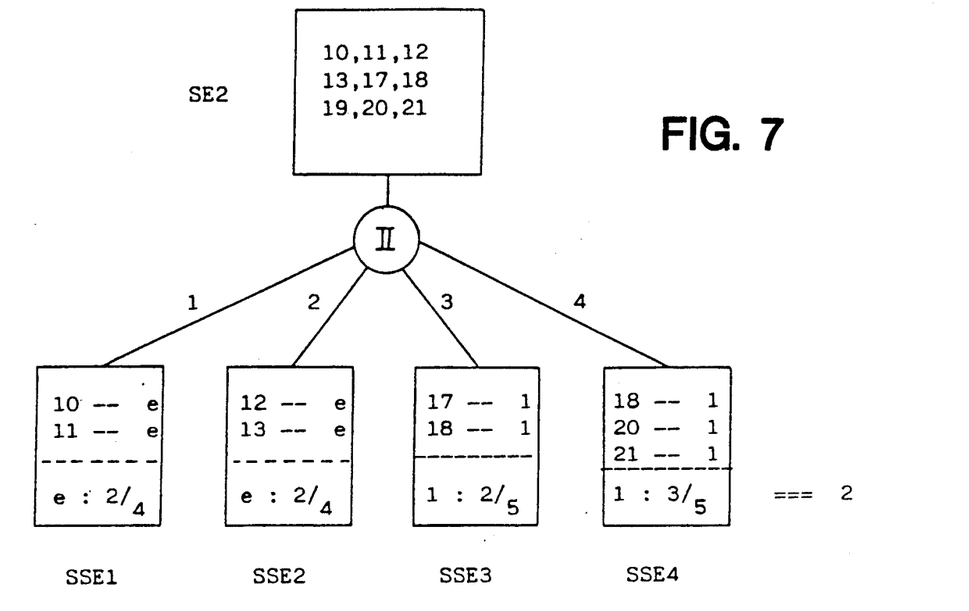
FIGS. 7 to 10 illustrate operating steps for setting up a decision tree according to the invention.

FIG. 7 shows how the criterion II is applied to the sub-set SE2. Since this criterion involves four possibilities of distinction, the structure illustrating the processing of the data of the sub-set SE2 comprises four branches each one ending with a sub-set SE2 designated by SSE1 to SSE4. The sub-set SSE1 provided by the possibility of distinction which bears the code number 1 contains the tracings of the characters with the codes 10 and 11 which are letters e. The sub-set SSE2 provided by the distinctive element or the possibility of distinction with the code 2 comprises the characters with the codes 12 and 13 which prove also to be letters e. The sub-sets SSE3 and 4 comprise the characters 17, 19, respectively, which are letters l and 18, 20, 21 which also are letters 1. A probability calculation determines the effectiveness of the criterion. For this purpose, the majority character only should be retained in each subset. The number of these characters is computed and that value is divided by the total numbers of characters of this type contained in the table. Then, the values thus obtained for the sub-sets SSE1 to SSE4 are added. In the case of FIG. 7, each sub-set only contains characters which designate one single letter. It is this letter which is a majority letter. Thus, the sub-set SSE1 contains two letters e thereby permitting to obtain the coefficient of probability 2/4, 4 being the total number of the letters e in the table. The sub-sets SSE2 to SSE4 provide the coefficients of probability 2/4, 2/5 and 3/5, respectively. The sum of these four coefficients amounts to 2 which constitutes the value determining the effectiveness of the criterion II.

Figure 8:
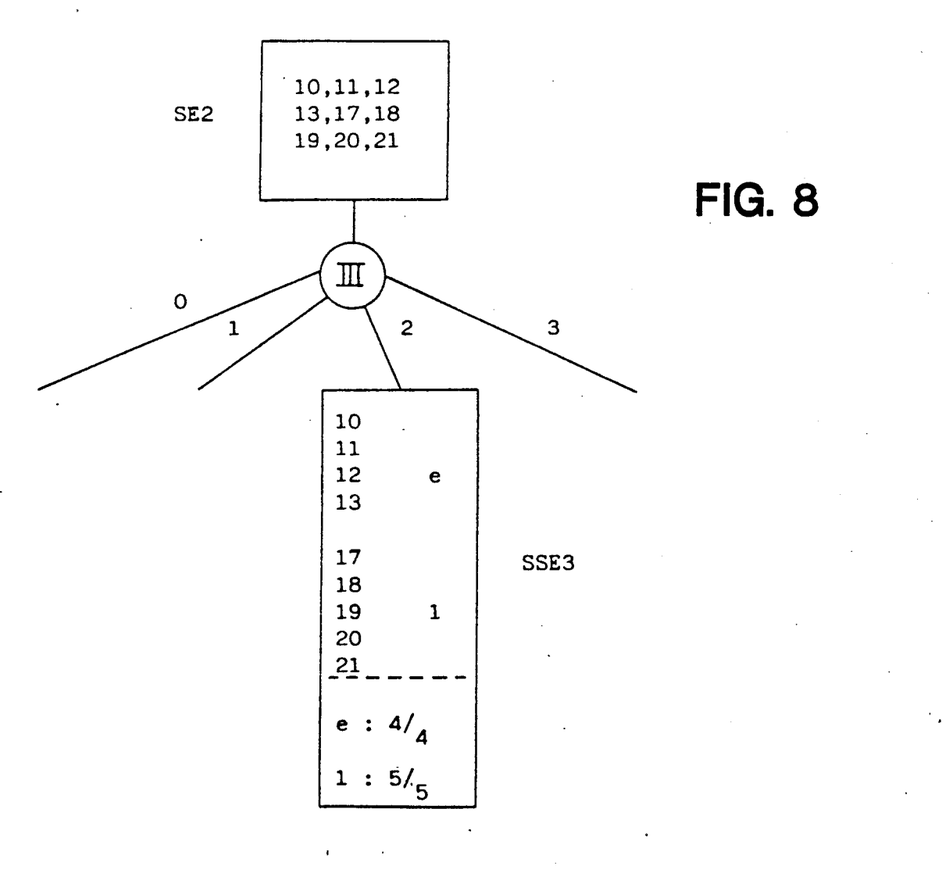

FIG. 8 illustrates the application to the sub-set SE2 of the criterion III comprising the four possibilities of distinction 0, 1, 2 and 3 which would lead to a structure with four branches. Since the possibilities 0, 1 and 3 are not associated in the table with any of the tracings or characters of the sub-set SE2, they do not result in the setting up of a sub-set of SE2. On the contrary, the possibility 2 gives rise to a sub-set SSE3 which contains all of the characters of SE2, i.e. four letters e and five letters 1. The coefficient of probability of the distribution of the letters e and 1 is 4/4 and 5/5, respectively. The sum of the coefficients of probability is equal to 1. This factor indicating the efficiency of the criterion is lower than the one obtained by using the criterion II. The latter therefore is considered as the most discriminating criterion and should be retained for setting up the decision tree as shown on FIG. 6.

Figure 9:
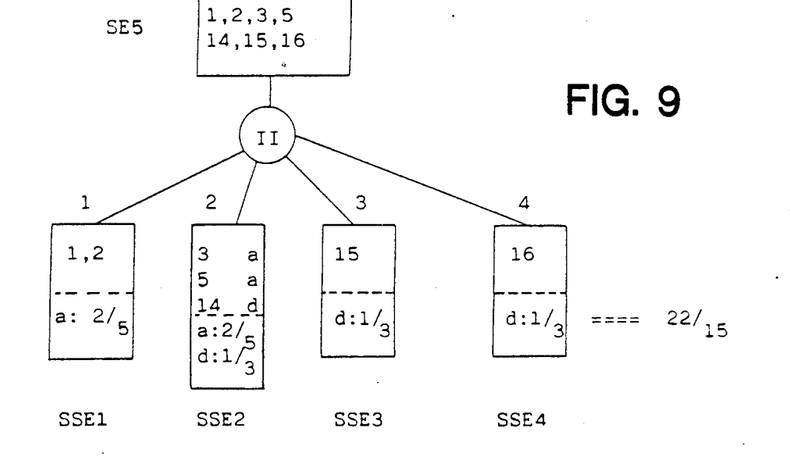
Figure 10:
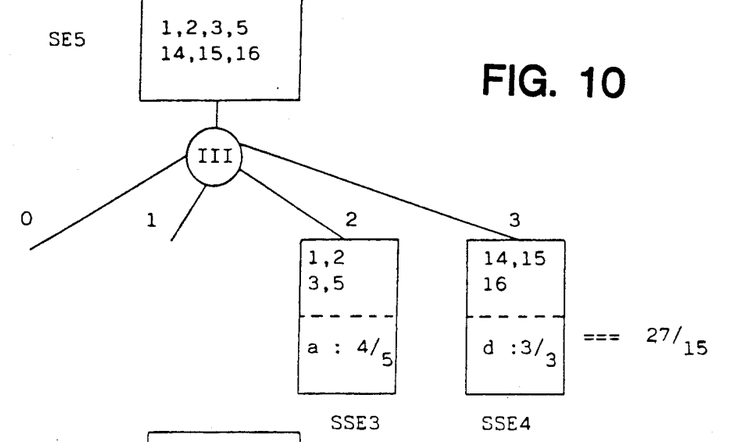

FIGS. 9 and 10 illustrate the treatment of the sub-set SE5 involving the application of all of the criterion except for the criterion BHGD. Since the present example is restricted to the criterions II and III, these two criterions only should be retained as in the case of the processing of the sub-set SE2. FIG. 9 gives the result of the application of the criterion II to the sub-set SE5. Four sub-sets SSE1 to SSE4 are obtained. The sub-set SSE1 contains the characters 1, 2 which all are letters a. The coefficient of probability is 2/5. The sub-set SSE2 comprises characters 3, 5 which are letters a and the character 14 designates the letter d. The probability calculation provides the coefficient 2/5 for the letter a and the coefficient 1/3 for the letter d. The letter a accordingly is a majority letter and the coefficient 2/5 should be retained for the calculation of the efficiency of the criterion II. The sub-sets SSE3 and SSE4 each one only contain one character which is a d, thereby providing coefficients of probability 1/3 and 1/3. The sum of all the coefficients of the majority letters yields the discrimination factor 22/15.

FIG. 10 shows the result of the use of the criterion III for distinguishing the characters contained in the subset SE5. To the extent where the criterion III comprises four possibilities of discrimination, four sub-sets should be obtained. Since no character of the sub-set SE5 exhibits in its measuring element, i.e. in the whole set of these characterizing features the code representative of the possibilities 0 and 1, only the possibilities 2 and 3 would each one provide one sub-set. The sub-set SE3 comprises the four characters 1, 2, 3 and 5 which all are letters a. The coefficient of probability 4/5 is obtained. The sub-set SSE4 comprises the characters 14 and 15, 16 which prove to be letters d. The coefficient of probability is 3/3 since 3 is the total number of the letters d. The sum of both coefficients of probability yields the value 9/5 equal to 27/15

The comparison of the factors indicating the effectiveness of discrimination of the criterions II and III as applied to the sub-sets of SE5 show that the criterion III together with its factor 27/15 is more efficient than the criterion II having a factor 22/15. The criterion III will therefore be retained in the decision tree of FIG. 6.

Figure 11:
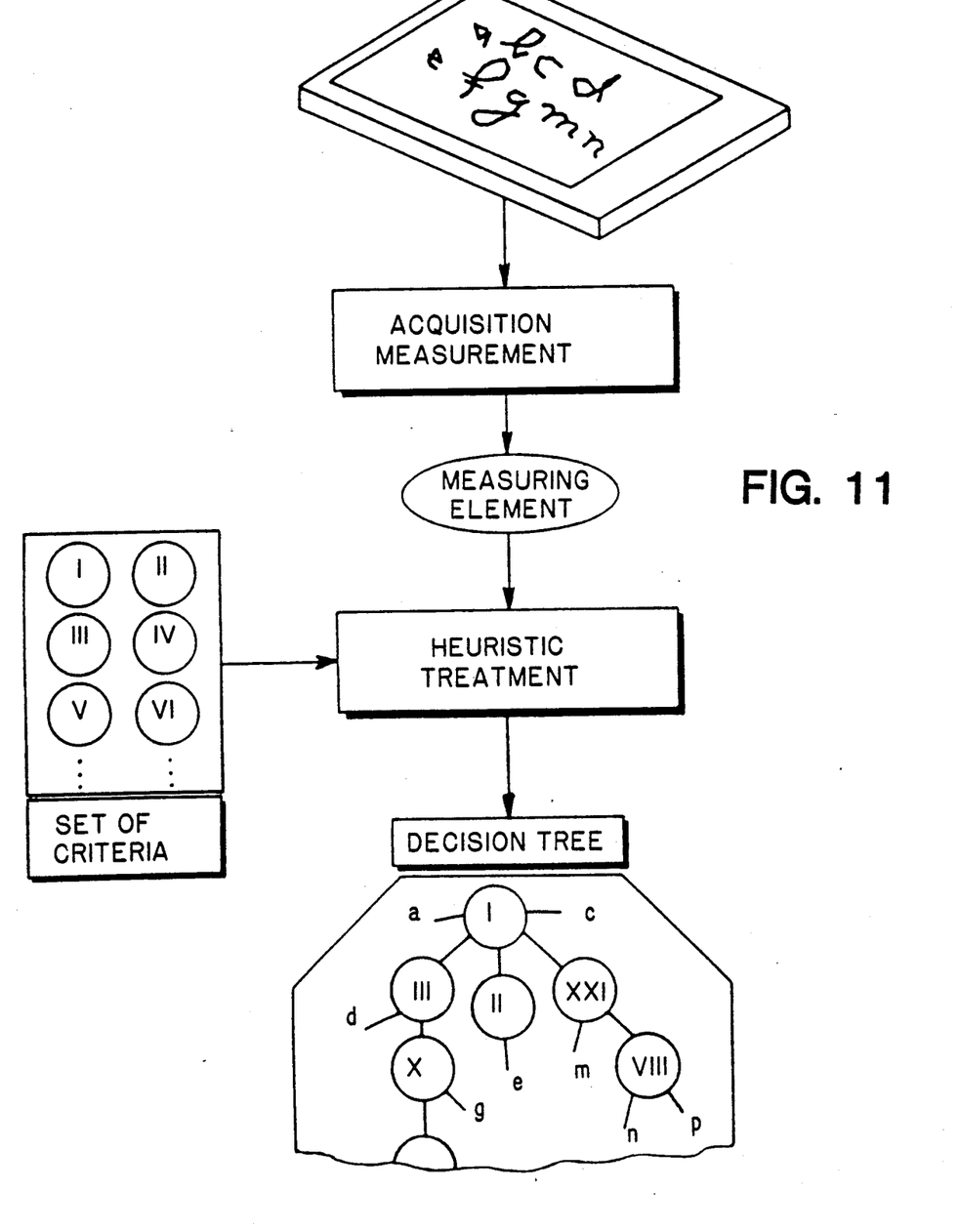
FIG. 11 shows the flow or process chart for setting up a decision tree according to the invention.

The detailed description which has just been made shows the principle of the heuristic treatment which leads to the construction of the decision tree which only retains the most discriminating characters and determines those criterions which will be used at each node or junction of the decision tree. Upon using as the first criterion the code HBGD, nearly 200 branches are obtained on a usual writing. Some branches are terminating in sub-sets which form leaves of the tree where a few characters are already sorted out and isolated from the others. The procedure of apprenticeship would end with the construction of the decision tree and the set up of the characterizing file of a given writing is represented in the form of a flow or process chart on FIG. 11. It is seen that in a first operating step, the person whose writing should be identified by the system would write the known text on a support, for instance a table to be digitalized. The Figure shows this table with a number of letters. This table which is known per se would generate from the tracings series of electrical signals each one representative of one point of the tracing and would convey it to a writing processing device such as a microcomputer. The latter is programmed to make the acquisition, the cutting out of the text into elements designated by their letter names as has just been described and would set up measuring elements for the various characters thereby leading to an organized structure in the way shown on the table according to FIG. 5. The microcomputer then carries out the heuristic treatment of generation of the decision tree by applying the criterions.

Figure 12:
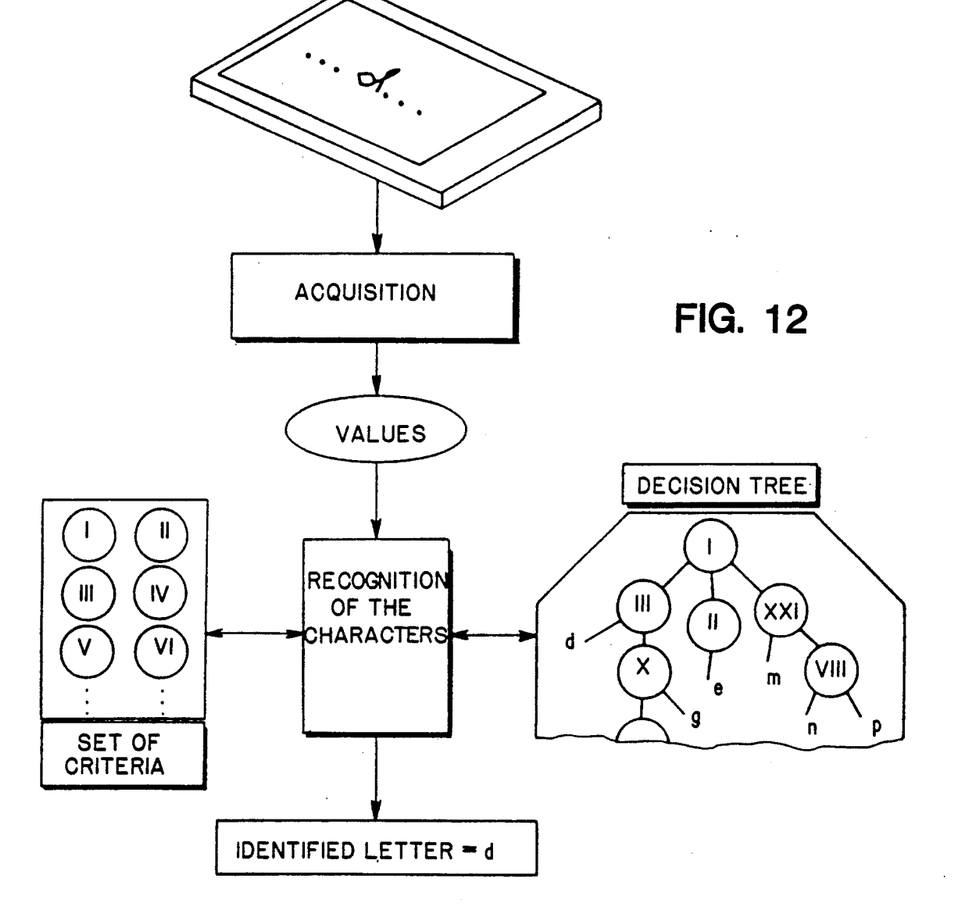
FIG. 12 shows the flow chart of the process of recognition of one letter according to the invention.

FIG. 12 shows in the form of a flow chart the procedure of the recognition of a text unknown to the system but written by a person for whom the system has previously set up a characterizing file containing a decision tree. In the given example, the person has written on the table to be digitalized the letter d. The microcomputer is programmed so as to perform as previously the acquisition of this character. The computer is programmed to then carry out the operating step proper of the recognition of the character d by referring to the decision tree which has been made for the person whose writing should be identified. Assuming that the criterion HBGD as applied to the tracing of the letter d to be identified gives the element having the code GDH, the decision tree of FIG. 6 will show that the letter to be identified should be located in the sub-set SE5. According to the decision tree, the criterion III should now be applied. If the criterion III applied to this same tracing gives as a result the code 3, the computer will know that the character to be identified should be located in the sub-set SSE4. This sub-set contains the characters with the codes 14, 15 and 16 which designate, according to the table of FIG. 5, actually the letter d. Thus, according to the invention, the computer could identify the letter d by applying two criterions only among the very numerous criterions which have been retained for setting up the measuring element for each letter. It should now be appreciated that the invention allows the real time recognition while using standard microcomputers for instance of the type usually employed in text processing systems.

If the writing having resulted in the construction of the decision tree undergoes modifications, the system according to the invention allows, at the same time as the recognition, an updating of the measuring elements of the modified character(s) and, if need be, of the decision tree.

Figure 13:
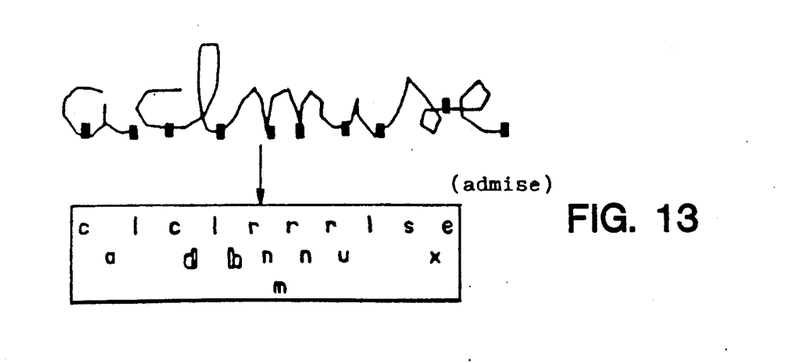
FIG. 13 illustrates the principle of a distribution lattice or pattern according to the invention.

An additional very useful characterizing aspect of the invention is the possibility of comparing groups of writing elements which form words to a dictionary of lexical form in order to be able to identify a word without necessarily identifying each one of the letters or in order to be able to remove ambiguities originating from the fact that a tracing may reasonably be cut out in several ways. Such a problem will be solved, according to the invention, by means of a structure which is called distribution lattice or pattern and of a hierarchized dictionary of a specific structure. FIG. 13 shows the French word "admise" together with the cuts the microcomputer could make and below the word the lattice or pattern set up by the same. This lattice or pattern shows the various possibilities of recognition of the tracing segments of the French word "admise". In this example however, only the most probable letters of each distribution are represented. Both assumptions of the letters "d" and "h" are mutually exclusive since they have one segment in common.

Figure 14:
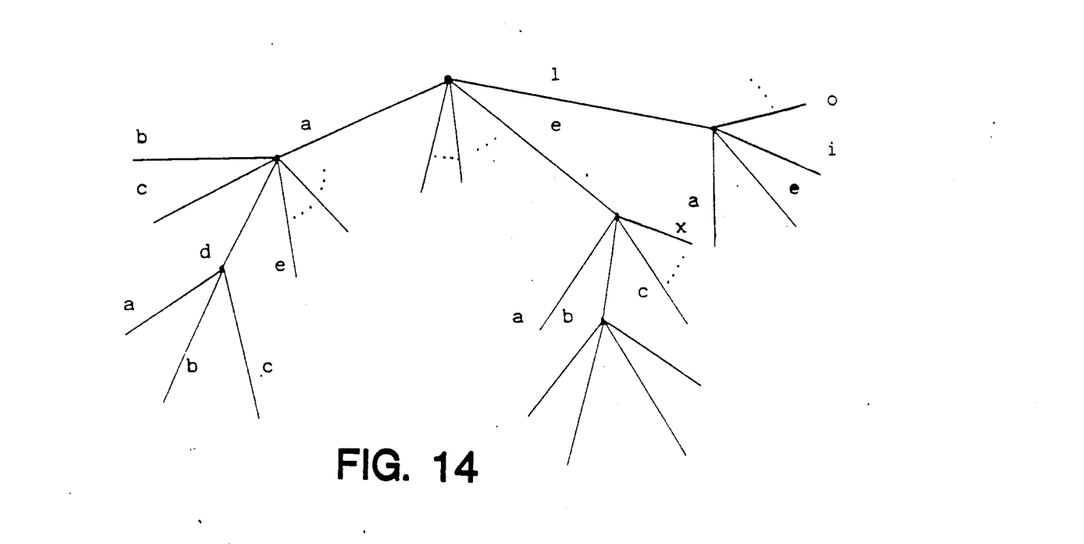
FIG. 14 illustrates the organization of a hierarchized dictionary according to the present invention.

The ambiguities will be removed by referring to the specific dictionary of the invention the principle of structure of which is illustrated on FIG. 14. This is an arborescent structure wherein for instance one branch is provided for each letter of the alphabet. All these branches are originating from a common point. Each branch comprises a node or junction from which are originating other branches each one of which is associated with one letter which is likely to form together with the initial branch a combination of letters likely to have a meaning. Each one of these sub-branches constitutes the starting point of new branches each one associated with one letter so as to form new combinations of letters which may have a meaning. This structure also permits to take into account various grammatical forms of the words. One arborescent structure containing for instance 80,000 words and taking into account different grammatical forms of a word, viz. 200,000 reasonable combinations of letters would be quite satisfactory for a real time recognition of a writing. Such a structure would however require a storage space of for instance 180 kilo-octets only.

Owing to the setting up of the decision tree during an apprenticeship procedure and if need be to the presence of a dictionary advantageously organized in the form of an arborescent structure, the method according to the invention makes possible the real time recognition of a writing by means of a standard equipment only requiring a writing support, carrier or backing such as a graphical table and a microcomputer. A microcomputer incorporating a central storage or memory of for instance 512 kilo-octets and increased by a suitable storage space for the lexicon would be quite satisfactory.

The method according to the invention has many applications. Thus, it may constitute an acquisition device for microcomputers thereby replacing the keyboard (direct writing, on tablets, of texts, orders etc) as well as a control member of the rolling type currently referred to as "mouse". It also permits the direct typewriting of handwritten texts by persons whose writings have previously been analyzed or scanned or learned during an apprenticeship procedure with a view to constitute a decision tree.

What is claimed is:

1. Method for the recognition of handwritings comprising writing elements to be recognized, such as letters and numerals, which comprises the steps of:

causing each person the handwriting of which is to be recognized to write a known text comprising the writing elements to be recognized;

analyzing the known handwritten text of each such person by applying thereto a multitude of analyzing criteria each having a predetermined number of values for the purpose of establishing for each writing element the value among said predetermined number of values which can be associated to each said writing element;

establishing for each writing element of said known handwritten text among all analyzing criteria the criterion which has the greatest power to discriminate the writing elements from one another, called the most discriminating one, to form a first series of sets each including only writing elements having the same first most discriminating criterion value;

applying to each set of said first series all criteria except for said first most discriminating one for forming a series of first subsets each containing writing elements having the same value of the applied criterion;

determining among the applied criterion the most discriminating one called second most discriminating criterion;

associating to each of said first series sets the first subsets resulting from the application of said second most discriminating criterion;

applying to each of said first subsets all criteria except the already applied first and second most discriminating ones for forming a series of second subsets for each criterion and determining the third most discriminating criterion;

continuing the steps recited hereinabove in order to establish sequences of subsets resulting from successively applying only the most discriminating criteria until obtaining subsets referring to only one writing element;

establishing from said sequences of sets and subsets a decision tree for each said known handwritten text; and recognizing an unknown handwritten text comprising writing element tracings of a person for the handwriting of which a decision tree has been previously established by applying to the tracings to be recognized the first most discriminating criterion indicated in the decision tree previously established for this person to obtain a criterion value, selecting in the decision tree the set including writing elements having this value applying to this selected set the second most discriminating criterion indicated in the decision tree and determining the second most discriminating criterion value for the writing element to be recognized, selecting in the decision tree among the first subsets associated to said selected set the subset which includes writing elements having the determined value, applying to this subset the third most discriminating criterion which is indicated in the decision tree as being associated to this subset, and continuing the steps recited hereinabove in accordance with the decision tree until reaching a subset referring to one writing element only, the analyzed tracing being considered to correspond to only said one writing element.

2. Method according to claim 1, wherein the determination of the most discriminating criterion which can be applied to a set or subset of writing elements obtained by previous application of a most discriminating criterion comprises the steps of applying to said set or subset all criteria except for the ones which have been previously retained as most discriminating criteria for forming for each criterion a number of subsets equal to the number of values associated to this criterion;

establishing in each said subset the number of different writing elements and retaining as majority writing element the element which is the most numerous one in this subset;

forming the coefficient of probability by dividing said number of the majority writing elements comprised in each said subset by the total number of said majority writing element comprised within the analyzed known handwritten text;

establishing the sum of the probability coefficients of all subsets obtained by the application of the same criterion; and retaining as most discriminating criterion applicable to said set or subset the criterion for which the sum of probability coefficients is the greatest.

3. Method according to claim 2, wherein the first criterion which is applied to a known handwritten text is the criterion taking into account the high points H, low points B, left hand portions G and right portions D as well as the points L at which the writing element has been lifted, of a writing element tracing is coded in the form of a succession of such points H, B, C, D, L.

4. Method according to claim 2, wherein among the criteria to be applied for recognizing a handwriting the criteria appreciating the geometrical features of the writing elements tracings, such as the height of these elements, their covertures in clockwise and reverse directions, their width and their position with respect to reference lines.

5. Method according to claim 1, wherein the known texts which are analyzed for establishing said decision trees and the texts which have to be recognized are written by hand on digitizing tables and a data processing device, such as a microcomputer is used and programmed for executing the steps of acquiring the writing element tracings and of the processing said tracings.

6. Method according to claim 5 wherein each known handwritten text is processed in order to establish a table-like structure including all writing elements and to each writing elements are associated the corresponding values of all applicable criteria in coded form.

7. Method according to claim 1, wherein the acquisition of unknown handwritten texts comprises the steps of cutting the texts in tracing elements with involving the discrimination of the particular points of possible cutting and of the evaluation, for every particular point, of the probability that this point constitutes a cut between two writing elements.

8. Method according to claim 7, comprising the step of comparing groups of provisionally identified elements with a dictionary containing such groups.

* * * * *